United States Patent
Aoki et al.

(10) Patent No.: US 10,451,958 B2
(45) Date of Patent: Oct. 22, 2019

(54) WAVELENGTH CONVERSION DEVICE, ILLUMINATION DEVICE AND PROJECTOR

(71) Applicant: Seiko Epson Corporation, Tokyo (JP)

(72) Inventors: Shigekazu Aoki, Matsumoto (JP); Akira Egawa, Shiojiri (JP); Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/346,057

(22) Filed: Nov. 8, 2016

(65) Prior Publication Data

US 2017/0176844 A1  Jun. 22, 2017

(30) Foreign Application Priority Data

Dec. 22, 2015  (JP) .................. 2015-249404

(51) Int. Cl.
| | |
|---|---|
| *G03B 21/20* | (2006.01) |
| *F21K 9/64* | (2016.01) |
| *G02B 19/00* | (2006.01) |
| *G02B 27/10* | (2006.01) |
| *G02B 27/14* | (2006.01) |
| *G02B 27/28* | (2006.01) |
| *G02B 5/02* | (2006.01) |
| *G02B 5/30* | (2006.01) |

(Continued)

(52) U.S. Cl.
CPC .............. *G03B 21/204* (2013.01); *F21K 9/64* (2016.08); *F21V 9/30* (2018.02); *G02B 5/3083* (2013.01); *G02B 27/0905* (2013.01); *G02B 27/0961* (2013.01); *G02B 27/1006* (2013.01); *G02B 27/141* (2013.01); *G03B 21/005* (2013.01); *G03B 21/16* (2013.01); *G03B 21/2013* (2013.01); *F21Y 2115/30* (2016.08); *G02B 5/0284* (2013.01); *G02B 19/0009* (2013.01); *G02B 27/149* (2013.01); *G02B 27/283* (2013.01)

(58) Field of Classification Search
CPC .. G02B 26/008; G03B 21/204; H04N 9/3111; H04N 9/3114; H04N 9/3117; F21K 9/64
See application file for complete search history.

(56) References Cited

U.S. PATENT DOCUMENTS

| | | | |
|---|---|---|---|
| 2009/0034105 A1* | 2/2009 | Ho .................. | G02B 7/008 359/892 |
| 2011/0149549 A1* | 6/2011 | Miyake .............. | F21V 7/22 362/84 |

(Continued)

FOREIGN PATENT DOCUMENTS

| | | |
|---|---|---|
| JP | 2011-129354 A | 6/2011 |
| JP | 2011-129406 A | 6/2011 |

(Continued)

*Primary Examiner* — Christina A Riddle
*Assistant Examiner* — Christopher A Lamb, II
(74) *Attorney, Agent, or Firm* — ALG Intellectual Propety, LLC

(57) ABSTRACT

A wavelength conversion device includes a rotating device and a base member which is rotated by the rotating device. The base member includes a wavelength conversion portion which is disposed in an annular shape on a first surface of the base member, a first region which is located further inside than the wavelength conversion portion, and a second region which is located further outside than the wavelength conversion portion, and is larger in surface area than the first region.

18 Claims, 8 Drawing Sheets

(51) Int. Cl.
*G03B 21/00* (2006.01)
*G03B 21/16* (2006.01)
*F21V 9/30* (2018.01)
*G02B 27/09* (2006.01)
*F21Y 115/30* (2016.01)

(56) References Cited

U.S. PATENT DOCUMENTS

| | | | | |
|---|---|---|---|---|
| 2013/0169938 A1* | 7/2013 | Huang | ................... | G03B 21/16 |
| | | | | 353/31 |
| 2015/0219870 A1* | 8/2015 | Adema | ................... | G02B 7/006 |
| | | | | 359/892 |
| 2015/0229892 A1* | 8/2015 | Dai | ...................... | H04N 9/3158 |
| | | | | 353/31 |
| 2015/0241046 A1* | 8/2015 | Hagemann | ............. | G03B 21/16 |
| | | | | 362/84 |
| 2016/0077325 A1* | 3/2016 | Tsai | ..................... | G02B 26/008 |
| | | | | 353/31 |
| 2018/0024424 A1* | 1/2018 | Hu | ........................... | F21V 9/40 |
| | | | | 362/322 |
| 2019/0049075 A1 | 2/2019 | Ishige et al. | | |

FOREIGN PATENT DOCUMENTS

| | | | | |
|---|---|---|---|---|
| JP | 2012-013897 A | | 1/2012 | |
| JP | 2012008177 A | * | 1/2012 | ........... G03B 21/204 |
| WO | WO-2016/185861 A | | 11/2016 | |

* cited by examiner

WAVELENGTH CONVERSION DEVICE, ILLUMINATION DEVICE AND PROJECTOR

CROSS-REFERENCE TO RELATED APPLICATION

The entire disclosure of Japanese Patent Application No. 2015-249404, filed Dec. 22, 2015 is expressly incorporated by reference herein.

BACKGROUND

1. Technical Field

The present invention relates to a wavelength conversion device, an illumination device and a projector.

2. Related Art

Hitherto, there has been known a light source device that performs wavelength conversion on excitation light emitted from a solid-state light source, and emits the converted light as fluorescence (see, for example, JP-A-2011-129354).

The light source device disclosed in JP-A-2011-129354 includes a solid-state light source and a reflection-type fluorescence rotating body. The reflection-type fluorescence rotating body out of these components includes a phosphor layer and a heat dissipation member to which the phosphor layer is fixed by a bonding member. In this phosphor layer, a portion of excitation light emitted from the solid-state light source is converted into light having a wavelength different from that of the excitation light to generate fluorescence.

Incidentally, it is known that, in a case where the temperature of the phosphor layer rises, the wavelength conversion efficiency of light incident from the solid-state light source decreases. Therefore, in a wavelength conversion device such as the reflection-type fluorescence rotating body disclosed in JP-A-2011-129354, a heat dissipation member is rotated, and a phosphor layer formed on the heat dissipation member is cooled.

However, in the wavelength conversion device disclosed in JP-A-2011-129354, since the phosphor layer is formed in the substantially entire region of the heat dissipation member (substrate) on the light incident side, a heat dissipation area for dissipating heat of the phosphor layer is insufficient even in a case where the heat dissipation member is rotated. Therefore, a case may occur in which the temperature of the phosphor layer has a tendency to rise, and the heat of the phosphor layer is not able to be reliably dissipated by the heat dissipation member.

That is, in the wavelength conversion device disclosed in JP-A-2011-129354, the phosphor layer is not able to be cooled to such an extent that a decrease in wavelength conversion efficiency does not occur, and thus there is a problem that a decrease in wavelength conversion efficiency due to the phosphor layer is incurred.

SUMMARY

An advantage of some aspects of the invention is to provide a wavelength conversion device, an illumination device and a projector which are capable of suppressing a decrease in wavelength conversion efficiency.

A wavelength conversion device according to a first aspect of the invention includes a base member, wherein the base member includes a wavelength conversion portion which is disposed in an annular shape on a first surface of the base member, a first region which is located further inside than the wavelength conversion portion, and a second region which is located further outside than the wavelength conversion portion, and is larger in surface area than the first region.

The wavelength conversion portion which is disposed in an annular shape on the first surface includes, for example, a case where wavelength conversion portions are disposed at a distance, in addition to a case where wavelength conversion portions are continuously formed in an annular shape. In addition, the wavelength conversion portion includes an element that makes the wavelength of incident light different, in addition to a wavelength conversion layer (phosphor layer) including a phosphor. Further, the wording "further inside and outside than the wavelength conversion portion" means further inside and outside than the wavelength conversion portion when seen from the incident direction side of light which is incident on the wavelength conversion portion.

According to the first aspect, the wavelength conversion portion is disposed on the first surface of the base member, the surface area of the second region located further outside than the wavelength conversion portion is larger than the surface area of the first region located further inside than the wavelength conversion portion.

For example, in a case where light is incident on the wavelength conversion portion, and heat of the wavelength conversion portion rises, the first region has a high possibility of thermal saturation due to a restricted surface area. On the other hand, the second region is located further outside than the wavelength conversion portion. Thereby, in a case where the surface area of the second region is made to be larger than the surface area of the first region through its design, thermal saturation is not likely to be generated. According to this, since heat generated in the wavelength conversion portion can be conducted to the first region located further inside than the wavelength conversion portion and the second region located further outside than the wavelength conversion portion, it is possible to efficiently cool the wavelength conversion portion. Therefore, it is possible to suppress a decrease in the wavelength conversion efficiency of the wavelength conversion device.

In the first aspect, it is preferable that the second region has at least one of a projection portion and a recess portion.

According to the first aspect with this configuration, since the second region has at least one of the projection portion and the recess portion, it is possible to increase the surface area of the second region, that is, the heat dissipation area of the wavelength conversion portion, as compared to a case where the second region is flat. Therefore, it is possible to further suppress a decrease in the wavelength conversion efficiency of the wavelength conversion device.

In the first aspect, it is preferable that the second region has a through-hole that passes through the base member.

An example of the through-hole capable of being exemplified includes a through-hole having a diameter to such an extent that an increment in the surface area of an end edge exposed due to the through-hole being formed becomes larger than a decrement in surface area due to the through-hole being formed in the base member.

According to the first aspect with this configuration, since the through-hole that passes through the base member is formed in the second region, it is possible to increase the heat dissipation area of the second region, as compared to a case where the second region is flat. Therefore it is possible to further suppress a decrease in the wavelength conversion efficiency of the wavelength conversion device.

In the first aspect, it is preferable to further include a protruding portion which is located in the second region, and protrudes from a second surface of the base member on an opposite side to the first surface.

According to the first aspect with this configuration, since the protruding portion that protrudes from the second surface on the opposite side to the first surface is included in the second region, it is possible to increase the heat dissipation area of the second region, as compared to a case where the protruding portion is not provided in the second region. Therefore, it is possible to reliably suppress a decrease in the wavelength conversion efficiency of the wavelength conversion device.

An illumination device according to a second aspect of the invention includes: the wavelength conversion device; and a light source that emits excitation light which is incident on the wavelength conversion portion of the wavelength conversion device, wherein the wavelength conversion portion converts the excitation light to be incident into light having a different wavelength.

In the second aspect, it is possible to exhibit the same operational effect as that of the wavelength conversion device. In addition, since a decrease in the wavelength conversion efficiency of the wavelength conversion device can be suppressed, it is possible to suppress a decrease in the amount of fluorescent light which is generated by the wavelength conversion portion, and to improve the use efficiency of light from the light source. Therefore, since the illumination device including the wavelength conversion device has high reliability, and can obtain stable diffusion characteristics and retardation characteristics which are not influenced by temperature, it is possible to increase the reliability and stability of the illumination device.

A projector according to a third aspect of the invention includes: the illumination device; a light modulating device that modulates light emitted from the illumination device; and a projection optical device that projects the light modulated by the light modulating device.

In the third aspect, it is possible to exhibit the same operational effect as that of the wavelength conversion device and the illumination device. In addition, since the illumination device including the wavelength conversion device has high reliability, and can obtain stable diffusion characteristics and retardation characteristics which are not influenced by temperature, it is possible to increase the reliability and stability of the projector including the illumination device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to accompanying drawings.

Schematic Configuration of Projector

Figure 1:
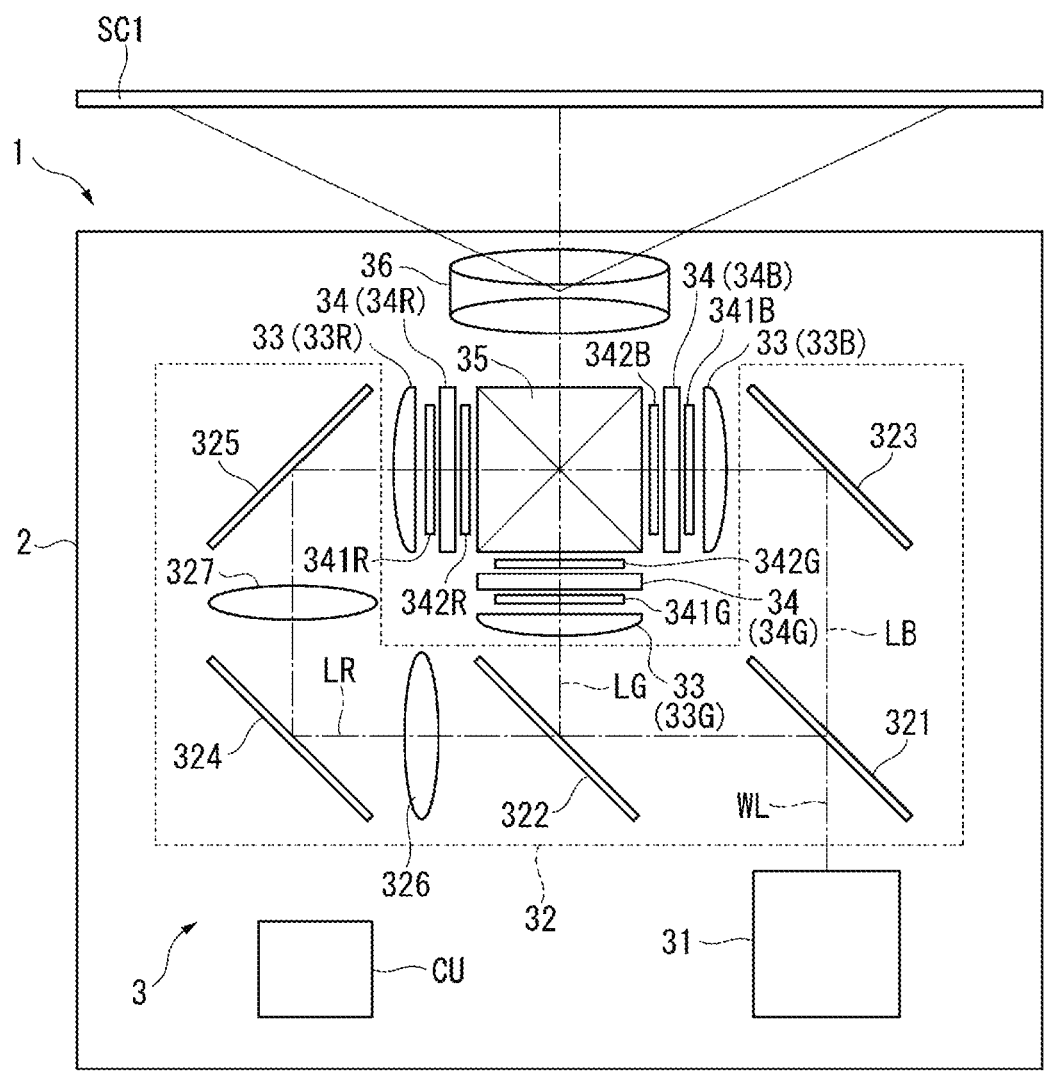
FIG. 1 is a schematic diagram of a projector according to a first embodiment of the invention.

FIG. 1 is a schematic diagram illustrating a configuration of a projector 1 according to the present embodiment.

The projector 1 is a display device that modulates a flux of light emitted from a light source provided therein to form an image based on image information, and extendedly projects the image on a projection surface such as a screen SC1.

As shown in FIG. 1, this projector 1 includes an exterior housing 2, an optical unit 3 which is housed within the exterior housing 2, and a control device CU that controls the projector 1, and additionally includes a cooling device that cools a cooling target and a power supply device that supplies power to electronic parts constituting the projector 1 which are not shown in the drawing. In addition, the projector 1 has a function of changing the color gamut of an image projected from a projection optical device, in accordance with the component ratio of light which is incident on a color synthesizing device.

Configuration of Optical Unit

The optical unit 3 includes an illumination device 31, a color separation device 32, collimating lenses 33, a plurality of light modulating devices 34, a color synthesizing device 35, and a projection optical device 36.

The illumination device 31 emits illumination light WL. The configuration of the illumination device 31 will be described later.

The color separation device 32 separates the illumination light WL incident from the illumination device 31 into three beams of colored light of red light LR, green light LG and blue light LB. This color separation device 32 includes dichroic mirrors 321 and 322, total reflection mirrors 323, 324, and 325 and relay lenses 326 and 327.

The dichroic mirror 321 separates the blue light LB and light including the other colored light (green light LG and red light LR) from the illumination light WL emitted from the illumination device 31. The dichroic mirror 321 transmits the blue light LB, and transmits the light including the green light LG and the red light LR.

The dichroic mirror 322 separates the green light LG and the red light LR from the light separated by the dichroic mirror 321. Specifically, the dichroic mirror 322 reflects the green light LG, and transmits the red light LR.

The total reflection mirror 323 is disposed in an optical path of the blue light LB, and reflects the blue light LB transmitted by the dichroic mirror 321 toward the light modulating device 34(34B). On the other hand, the total reflection mirrors 324 and 325 are disposed in an optical path of the red light LR, and reflects the red light LR having passed through the dichroic mirror 322 toward the light modulating device 34(34R). In addition, the green light LG is reflected toward the light modulating device 34(34G) by the dichroic mirror 322.

The relay lenses 326 and 327 are disposed downstream of the dichroic mirror 322 in the optical path of the red light LR. These relay lenses 326 and 327 have a function of compensating for a light loss of the red light LR due to the optical path length of the red light LR becoming larger than the optical path length of the blue light LB or the green light LG.

The collimating lenses 33 collimate light which is incident on the light modulating device 34 described later. Collimating lenses for respective beams of colored light of red, green and blue are set to 33R, 33G, and 33B, respectively. In addition, light modulating devices for respective beams of colored light of red, green and blue are set to 34R, 34G, and 34B, respectively.

The plurality of light modulating devices 34 (34R, 34G, and 34B) modulate the respective beams of colored light LR, LG, and LB which are separated and incident by the dichroic mirror 321 and the dichroic mirror 322, and form a color image based on image information. These light modulating devices 34 are constituted by a liquid crystal panel that modulates light to be incident. Incident-side polarizing plates 341 (341R, 341G, and 341B) and emission-side polarizing plates 342 (342R, 342G, and 342B) are disposed on the incident sides and emission sides of the light modulating devices 34R, 34G, and 34B, respectively.

Beams of image light from the respective light modulating devices 34R, 34G, and 34B are incident on the color synthesizing device 35. This color synthesizing device 35 synthesizes the beams of image light corresponding to the respective beams of colored light LR, LG, and LB, and emits this synthesized image light toward the projection optical device 36. In the present embodiment, the color synthesizing device 35 is constituted by a cross dichroic prism.

The projection optical device 36 projects the image light synthesized by the color synthesizing device 35 onto a projection surface such as the screen SC1. With such a configuration, a magnified image is projected onto the screen SC1.

Configuration of Illumination Device

Figure 2:
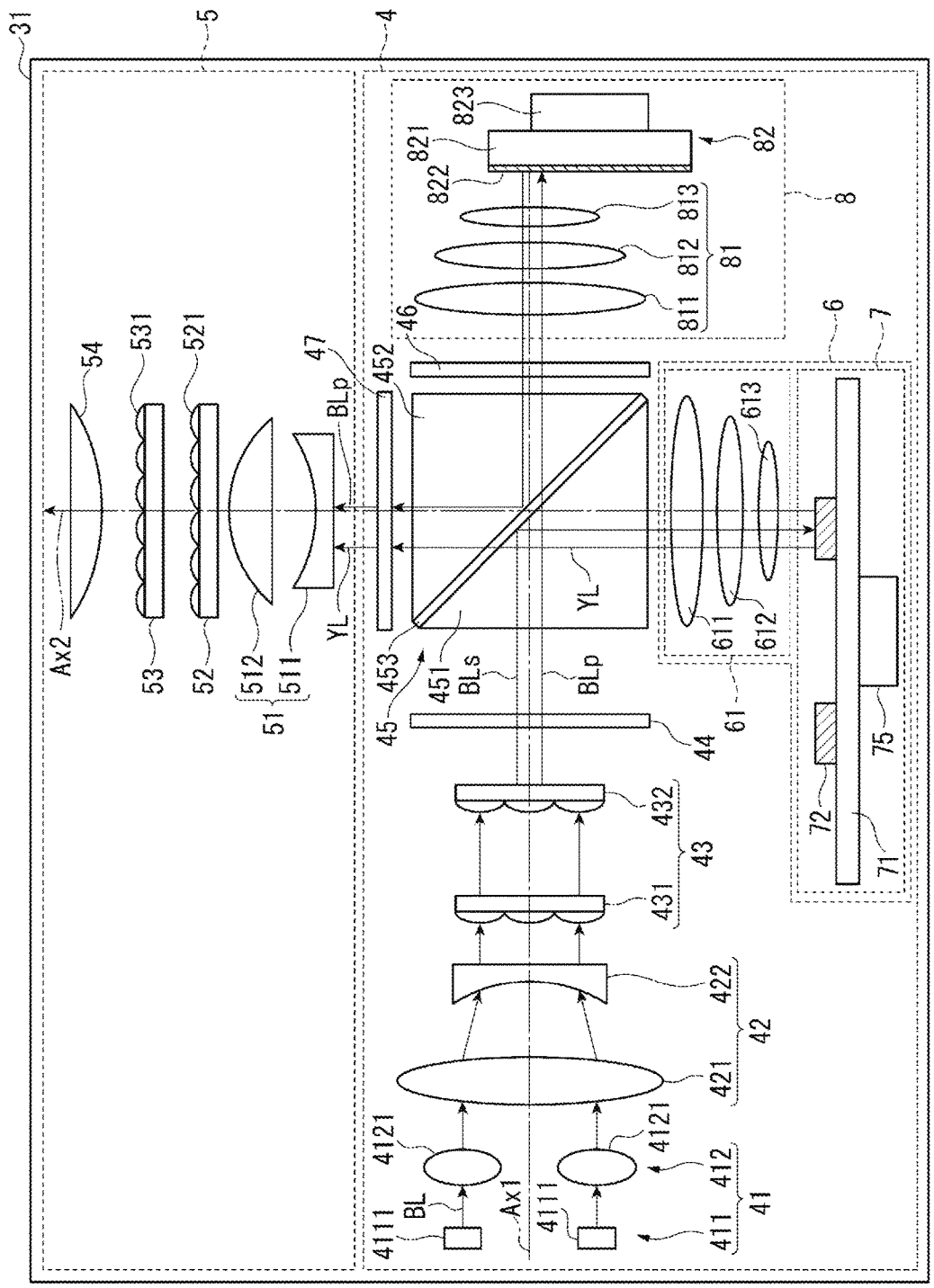
FIG. 2 is a schematic diagram of an illumination device of the projector according to the first embodiment.

FIG. 2 is a schematic diagram illustrating a configuration of the illumination device 31 of the projector 1 in the present embodiment.

As described above, the illumination device 31 emits the illumination light WL toward the color separation device 32. As shown in FIG. 2, this illumination device 31 includes a light source device 4 and a uniformizing device 5. This light source device 4 emits blue light and fluorescence toward the uniformizing device 5, and the uniformizing device 5 uniformizes the incident blue light and fluorescence, and emits the uniformized blue light and fluorescence, as the illumination light WL, toward the color separation device 32.

Configuration of Light Source Device

As shown in FIG. 2, the light source device 4 includes a light source portion 41, an afocal lens 42, a homogenizer optical system 43, a first retardation plate 44, a polarization separation device 45, a second retardation plate 46, a third retardation plate 47, a fluorescence reflection device 6 and a blue light reflection device 8.

The light source portion 41 includes an array light source 411 and a collimator optical system 412. This array light source 411 is constituted by a plurality of semiconductor lasers 4111 equivalent to the light source according to the invention. Specifically, the array light source 411 is formed by the plurality of semiconductor lasers 4111 being arranged in an array within one plane orthogonal to an illumination optical axis Ax1 of a flux of light which is emitted from the array light source 411. Though described later in detail, when the illumination optical axis of a flux of light reflected by the fluorescence reflection device 6 is set to Ax2, the illumination optical axis Ax1 and the illumination optical axis Ax2 lie in the same plane, and are orthogonal to each other. On the illumination optical axis Ax1, the array light source 411, the collimator optical system 412, the afocal lens 42, the homogenizer optical system 43, the first retardation plate 44, the polarization separation device 45, the second retardation plate 46, and the blue light reflection device 8 are disposed side by side in this order.

On the other hand, on the illumination optical axis Ax2, the fluorescence reflection device 6 (wavelength conversion device 7 and pickup optical system 61), the polarization separation device 45, and the uniformizing device 5 (afocal device 51, first lens array 52, second lens array 53 and superposition lens 54) are disposed side by side in this order.

The semiconductor laser 4111 constituting the array light source 411 emits excitation light (blue light BL) having a peak wavelength in a wavelength region of, for example, 445 nm. In addition, the blue light BL which is emitted from the semiconductor laser 4111 is random linearly polarized light including s-polarized light and p-polarized light, and is emitted toward the afocal lens 42. The blue light BL emitted from the array light source 411 is incident on the collimator optical system 412.

The collimator optical system 412 converts the blue light BL emitted from the array light source 411 into collimated light. This collimator optical system 412 corresponds to, for example, each of the semiconductor lasers 4111 and includes a plurality of collimator lenses 4121 disposed in an array. The blue light BL converted into collimated light by passing through this collimator optical system 412 is incident on the afocal lens 42.

The afocal lens 42 adjusts the diameter of a flux of light of the blue light BL incident from the collimator optical system 412. This afocal lens 42 includes a lens 421 and a lens 422. The blue light BL is condensed by the lens 421, collimated by the lens 422, and incident on the homogenizer optical system 43.

The homogenizer optical system 43 uniformizes the illuminance distribution of the blue light BL in a region to be illuminated. This homogenizer optical system 43 includes a pair of multi-lens arrays 431 and 432. The blue light BL emitted from this homogenizer optical system 43 is incident on the first retardation plate 44.

The first retardation plate 44 is disposed between the homogenizer optical system 43 and the polarization separation device 45, and rotates the polarization direction of the incident blue light BL by approximately 90°. In the present embodiment, the first retardation plate 44 is constituted by a λ/2-wavelength plate. The blue light BL incident on this first retardation plate 44 has the polarization direction thereof rotated by approximately 90°, is separated into blue light BLp of a p-polarization component and blue light BLs of an s-polarization component, and is incident on the polarization separation device 45.

Configuration of Polarization Separation Device

The polarization separation device 45 which is a so-called prism-type polarization beam splitter transmits one polarized light of the p-polarized light and the s-polarized light, and reflects the other polarized light. This polarization separation device 45 includes prisms 451 and 452 and a polarization separation layer 453. These prisms 451 and 452 are formed in a substantially triangular prism shape, each have an inclined surface at 45 angles to the illumination optical axis Ax1, and are at 45 angles to the illumination optical axis Ax1.

The polarization separation layer 453 is provided on the inclined surface, and has a polarization separation function of separating the beams of blue light BLp and BLs incident on the polarization separation layer 453 into the blue light BLp of a p-polarization component and the blue light BLs of an s-polarization component. This polarization separation layer 453 reflects the blue light BLs of an s-polarization component, and transmits the blue light BLp of a p-polarization component. In addition, the polarization separation layer 453 has a color separation function of transmitting light out of the beams of light incident on the polarization separation layer 453 which has a second wavelength range (fluorescence YL) different from a first wavelength range (wavelength range of the beams of blue light BLs and BLp), regardless of its-polarization state. As the polarization separation device 45, a plate-type polarization separation device may be used without being limited to a prism-type device.

The blue light BLs of an s-polarization component out of the beams of blue light BLp and BLs incident on the polarization separation layer 453 is reflected toward the fluorescence reflection device 6, as excitation light BLs.

Configuration of Fluorescence Reflection Device

The fluorescence reflection device 6 converts the blue light (excitation light) BLs of an s-polarization component incident from the polarization separation device 45 into fluorescence YL, and reflects the converted light toward the polarization separation device 45. This fluorescence reflection device 6 includes the pickup optical system 61 and the wavelength conversion device 7. The pickup optical system 61 out of these components condenses the excitation light BLs toward a wavelength conversion layer 72 of the wavelength conversion device 7.

This pickup optical system 61 includes a lens 611, a lens 612 and a lens 613. Specifically, the pickup optical system 61 condenses a plurality of incident fluxes of light (excitation light BLs) toward the wavelength conversion layer 72 described later, and superposes the fluxes of light on the wavelength conversion layer 72.

The blue light BLs is converted into the fluorescence YL by this wavelength conversion layer 72, is incident on the pickup optical system 61 again, and is incident on the polarization separation device 45 through the pickup optical system 61.

The configuration of the wavelength conversion device 7 will be described later.

On the other hand, the blue light BLp of a p-polarization component out of the beams of blue light BLp and BLs incident on the polarization separation layer 453 passes through the polarization separation layer 453, and is incident on the second retardation plate 46.

The second retardation plate 46 is disposed between the blue light reflection device 8 and the polarization separation device 45, and converts the blue light BLp of a p-polarization component to be incident into circularly polarized light. In the present embodiment, this second retardation plate 46 is a constituted by λ/4-wavelength plate. The blue light BLp converted into circularly polarized light by the second retardation plate 46 is incident on the blue light reflection device 8.

Configuration of Blue Light Reflection Device

The blue light reflection device 8 diffuses the blue light BLp of a p-polarization component incident from the polarization separation device 45, and reflects the diffused blue light toward the polarization separation device 45. This blue light reflection device 8 includes a pickup optical system 81 and a diffuse reflection device 82. The pickup optical system 81 out of these components condenses the excitation light BLp toward a diffuse reflection layer 822 of the diffuse reflection device 82. This pickup optical system 81 includes a lens 811, a lens 812 and a lens 813. Specifically, the pickup optical system 81 condenses a plurality of incident fluxes of light (excitation light BLp) toward the diffuse reflection layer 822 described later, and superposes the fluxes of light on the diffuse reflection layer 822.

The diffuse reflection device 82 has a function of diffusing and reflecting the incident blue light BLp. This diffuse reflection device 82 includes a base member 821, a diffuse reflection layer 822 and a motor 823. The base member 821 is constituted by a substantially discoid base member, and has the diffuse reflection layer 822 formed on the surface of the base member 821 facing the pickup optical system 81. This diffuse reflection layer 822 has a function of scattering and reflecting incident light.

The motor 823 is installed on the opposite side to the side of the base member 821 on which the diffuse reflection layer 822 is provided, and the base member 821 is rotated by drive of the motor 823. Thereby, the diffuse reflection layer 822 is cooled.

With such a configuration, the blue light BLp incident on the diffuse reflection device 82 is incident on the diffuse reflection layer 822, is diffused (scattered) by the diffuse reflection layer 822, and emitted toward the pickup optical system 81. The blue light BLp is condensed by the pickup optical system 81, and is incident on the second retardation plate 46 again. Thereby, the blue light BLp has the rotation direction thereof reversed by the diffuse reflection layer 822, is incident on the second retardation plate 46, and has the polarization direction thereof converted from circularly polarized light into linearly polarized light. Therefore, the blue light BLp reflected by the diffuse reflection layer 822 is emitted as the blue light BLs of an s-polarization component. The blue light BLs is incident on the polarization separation device 45.

The blue light BLs incident on the polarization separation device 45 through the diffuse reflection device 82 and the pickup optical system 81 is reflected from the polarization separation layer 453, is emitted from the prism 452 side of the polarization separation device 45, and is incident on the third retardation plate 47.

On the other hand, the fluorescence YL incident on the polarization separation device 45 is emitted from the prism 452 side of the polarization separation device 45 through the polarization separation layer 453, and is incident on the third retardation plate 47.

The third retardation plate 47 is disposed between the polarization separation device 45 and the uniformizing device 5, and rotates the polarization directions of the blue light BLs and the fluorescence YL to be incident by approximately 90°. In the present embodiment, the third retardation plate 47 is constituted by a λ/2-wavelength plate. The blue light BLs incident on the third retardation plate 47 has the polarization direction thereof rotated by approximately 90°, and is emitted toward the uniformizing device 5, as the blue light BLp of a p-polarization component. In addition, the fluorescence YL is light based on the excitation light BLs, and thus is light of an s-polarization component. Therefore, the fluorescence YL incident on the third retardation plate 47 is emitted toward the uniformizing device 5, as the fluorescence YL of a p-polarization component.

Configuration of Uniformizing Device

The uniformizing device 5 has a function of uniformizing the blue light BL and the fluorescence YL which are emitted from the light source device 4. As shown in FIG. 2, this uniformizing device 5 includes the afocal device 51, the first lens array 52, the second lens array 53 and the superposition lens 54.

Among these components, the afocal device 51 has a function of expanding the beam systems of the fluorescence YL and the blue light BL which are incident from the light source device 4. Specifically, this afocal device 51 adjusts the size of a light source image which is displayed on a second lens 531 of the second lens array 53, on the basis of the fluorescence YL and the blue light BL which are incident through the light source device 4.

This afocal device 51 is constituted by afocal lenses consisting of a concave lens 511 and a convex lens 512. The concave lens 511 diffuses the fluorescence YL and the blue light BL which are incident, and emits these diffused beams of light toward the convex lens 512. The convex lens 512 collimates the fluorescence YL and the blue light BL which are diffused and incident from the concave lens 511, and emits the collimated beams of light toward the first lens array 52.

The first lens array 52 includes a plurality of first lenses 521 arranged in an array within an orthogonal plane with respect to the central axis (the illumination optical axis Ax1) of light (flux of light) emitted from the afocal device 51. This first lens array 52 divides a flux of light incident on the first lens array 52 into a plurality of partial fluxes of light through the plurality of first lenses 521 of the first lens array 52.

The second lens array 53 includes a plurality of second lenses 531 corresponding to the plurality of first lenses 521 of the first lens array 52 arranged in an array within an orthogonal plane with respect to the illumination optical axis Ax1. This second lens array 53 superposes the partial flux of light, divided by the first lens 521, on the superposition lens 54 as a region to be illuminated, through the plurality of second lenses 531.

The superposition lens 54 superposes the illumination light WL in the region to be illuminated to thereby uniformize the illuminance distribution of the region to be illuminated. In this manner, the fluorescence YL and the blue light BL are synthesized by the superposition lens 54, and are emitted from the illumination device 31 toward the dichroic mirror 321, as the illumination light WL whose illuminance distribution is uniformized.

Configuration of Wavelength Conversion Device

Figure 3:
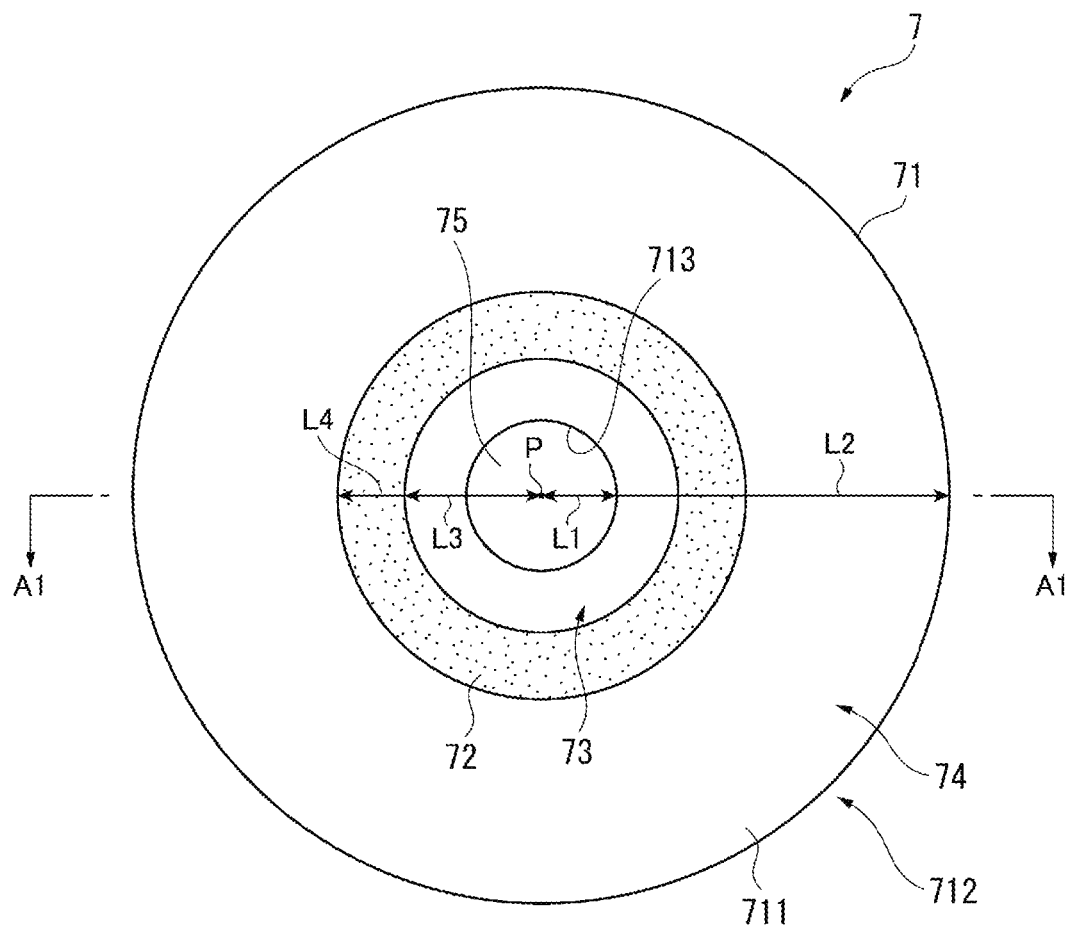
FIG. 3 is a plan view when a wavelength conversion device of the illumination device according to the first embodiment is seen from the incident side of light which is incident on the wavelength conversion device.

FIG. 3 is a plan view when the wavelength conversion device 7 is seen from the polarization separation device 45 side.

In the present embodiment, the wavelength conversion device 7 includes a base member 71 and a motor 75, as shown in FIGS. 2 and 3 as an example.

The base member 71 is formed in a substantially discoid shape. This base member 71 has a first surface 711 of the base member 71 facing the polarization separation device 45 (pickup optical system 61), and a second surface 712 facing the first surface 711. In addition, an opening 713 is formed at the substantially central portion of the base member 71. A portion of the motor 75 is fitted into this opening 713. The base member 71 is constituted of aluminum, and the thickness dimension of the base member 71 is set to approximately 1 mm.

In addition, the wavelength conversion layer 72 is disposed on the first surface 711 out of the first surface 711 and the second surface 712 which is a surface facing the pickup optical system 61.

The wavelength conversion layer 72 is equivalent to the wavelength conversion portion according to the invention, and is disposed on the first surface 711 of the base member as described above. Specifically, the wavelength conversion layer 72 is printed in an annular shape by, for example, a mask printing method, and is formed outside the opening 713 of the base member 71. This wavelength conversion layer 72 is, for example, a wavelength conversion element including a YAG phosphor, and converts the blue light BLs incident on the wavelength conversion layer 72 into the fluorescence YL.

In addition, when the base member 71 is seen from the light incident side, the base member 71 includes a first region 73 located further inside than the wavelength conversion layer 72, and a second region 74 which is a region located further outside than the wavelength conversion layer 72. The surface area of the second region 74 out of the above regions is set to be larger than the surface area of the first region 73.

Though not shown in FIGS. 2 and 3, a reflection layer is formed between the wavelength conversion layer 72 and the base member 71.

Area of First Region and Area of Second Region

Here, the radius of the opening 713 is, for example, a distance L1 from a rotational axis P in FIG. 3 to the outer circumferential edge of the opening 713, the outside radius of the base member 71 is, for example, a distance L2 from the rotational axis P in FIG. 3 to the outer circumferential edge of the base member 71, the inside radius of the wavelength conversion layer 72 is, for example, a distance L3 from the rotational axis P in FIG. 3 to the inner circumferential edge of the wavelength conversion layer 72, and the outside radius of the wavelength conversion layer 72 is, for example, a distance L4 from the rotational axis P in FIG. 3 to the outer circumferential edge of the wavelength conversion layer 72. The rotational axis P is coincident with the center of the base member 71.

In the present embodiment, the distance L1 is set to approximately 10 mm, the distance L2 is set to approximately 55 mm, the distance L3 is set to approximately 20 mm, and the distance L4 is set to approximately 31.5 mm. Therefore, on the first surface 711 of the base member 71, the surface area of the second region 74 is larger than the surface area of the first region 73.

A rotating device according to the invention is constituted by the motor 75, and has a function of rotating the base member 71 around the rotational axis P. Specifically, a portion of the motor 75 is fitted into the opening 713 of the base member 71, and the base member 71 is rotated by drive of the motor 75. Thereby, the blue light BLs emitted from the pickup optical system 61 is incident on the wavelength conversion layer 72 in the base member 71 in a rotating state, is converted into the fluorescence YL, and is reflected by the reflection layer.

Figure 4:
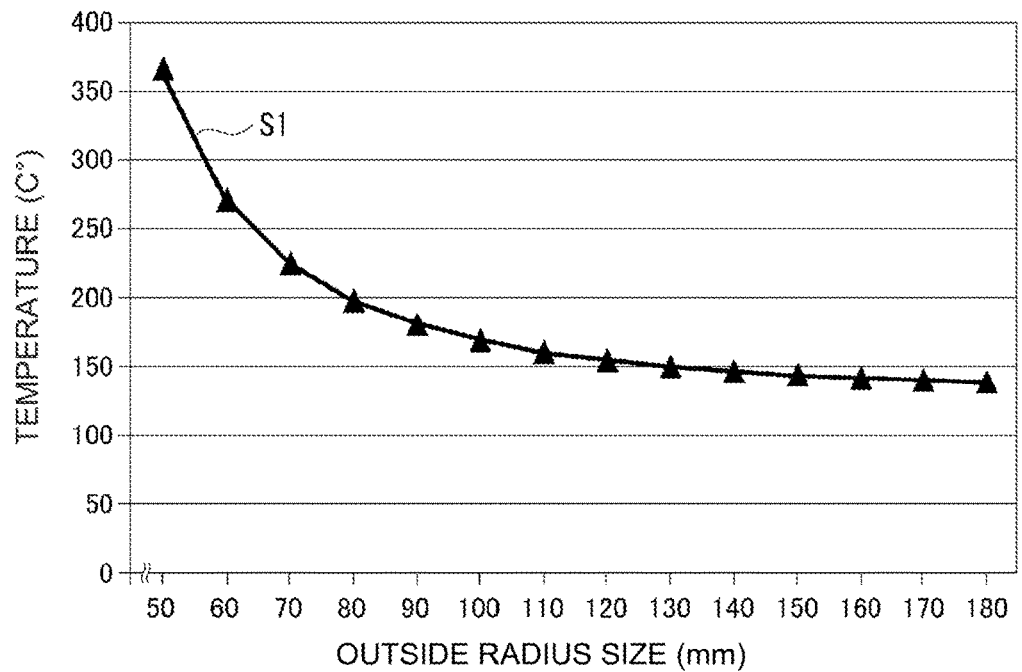
FIG. 4 is a diagram illustrating a relationship between the outside radius size of a base member of the wavelength conversion device according to the first embodiment and the temperature of a wavelength conversion layer.

Relationship Between Outside Radius of Base Member and Temperature of Wavelength Conversion Layer FIG. 4 is a diagram illustrating a relationship between the outside radius of the base member and the temperature of the wavelength conversion layer.

In the description of FIG. 4, the amount of laser light to be incident is constant, the distance L1 is set to approximately 10 mm, the distance L3 is set to approximately 20 mm, and the distance L4 is set to approximately 31.5 mm. In addition, a case will be described in which the thickness dimension of the base member is set to approximately 1 mm, the base member is constituted of aluminum, and only the outside radius (distance L2) of the base member is changed.

In a case where the outside radius of the base member is changed, the temperature of a phosphor is changed as shown by a line Si shown in FIG. 4. That is, the temperature of the phosphor decreases with an increase in the outside radius (distance L2) of the base member. Specifically, in a case where the outside radius (distance L2) of the base member is 50 mm, as shown in FIG. 4, the temperature of the phosphor rises up to approximately 370° C. to the maximum. On the other hand, in a case where the distance L2 is 80 mm, the temperature of the phosphor rises up to approximately 200° C. to the maximum. Further, in a case where the distance L2 is 120 mm, the temperature of the phosphor rises up to approximately 160° C. to the maximum. That is, it is possible to suppress a rise in the temperature of the wavelength conversion layer 72 with an increase in the outside radius (distance L2) of the base member.

That is, it is possible to further suppress a rise in the temperature of the phosphor with an increase in the surface area of the second region 74, with respect to the surface area of the first region 73.

Effect of First Embodiment

According to the projector 1 of the first embodiment of the invention, the following effects are exhibited.

The wavelength conversion layer 72 is disposed in an annular shape on the first surface 711 of the base member 71 which is rotated by the motor 75, and the surface area of the second region 74 located further outside than the wavelength conversion layer 72 is larger than the surface area of the first region 73 located further inside than the wavelength conversion layer 72. For this reason, in a case where light is incident on the wavelength conversion layer 72, and heat of the wavelength conversion layer 72 rises, the first region 73 has a high possibility of thermal saturation due to a restricted surface area. On the other hand, the second region 74 is located further outside than the wavelength conversion layer 72. Thereby, in a case where the surface area of the second region 74 is made to be larger than the surface area of the first region 73 through its design, thermal saturation is not likely to be generated. According to this, since heat generated in the wavelength conversion layer 72 can be conducted to the first region 73 located further insider than the wavelength conversion layer 72 and the second region 74 located further outside than the wavelength conversion layer 72, it is possible to efficiently cool the wavelength conversion layer 72. Therefore, it is possible to suppress a decrease in the wavelength conversion efficiency of the wavelength conversion device 7.

Since a decrease in the wavelength conversion efficiency of the wavelength conversion device 7 can be suppressed, it is possible to suppress a decrease in the amount of fluorescent light generated by the wavelength conversion layer 72, and to improve the use efficiency of light from the light source portion 41. Therefore, since the illumination device 31 including the wavelength conversion device 7 has high reliability, and can obtain stable diffusion characteristics and retardation characteristics which are not influenced by temperature, it is possible to increase the reliability and stability of the illumination device 31 and the projector 1.

Second Embodiment

Next, a second embodiment of the invention will be described.

A projector according to the present embodiment has substantially the same configuration as that of the projector 1 according to the first embodiment, and is partially different in the shape of the base member of the wavelength conversion device from the projector 1.

Specifically, in that the wavelength conversion device 7 of the projector 1 includes the base member 71, whereas a wavelength conversion device of the present embodiment includes the base member having a plurality of projection portions, both the wavelength conversion devices are different from each other.

In the following description, the same or substantially the same portions as the portions previously described are denoted by the same reference numerals and signs, and thus the description thereof will not be given.

Figure 5:
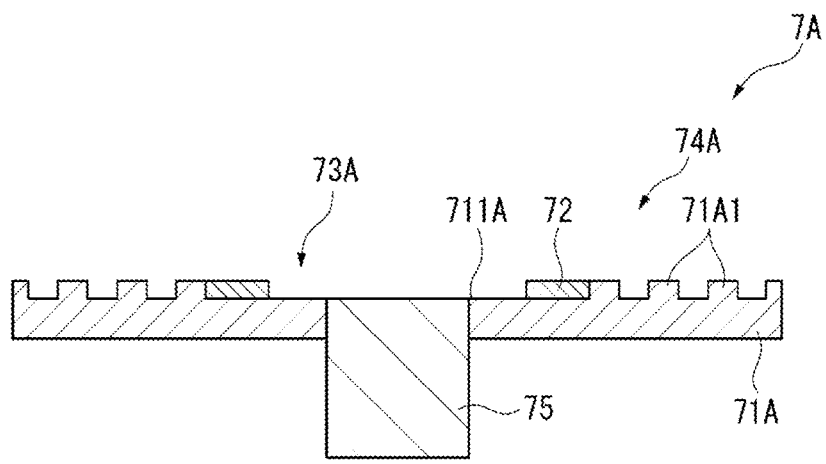
FIG. 5 is a cross-sectional view of a wavelength conversion device of a projector according to a second embodiment of the invention.
Figure 6:
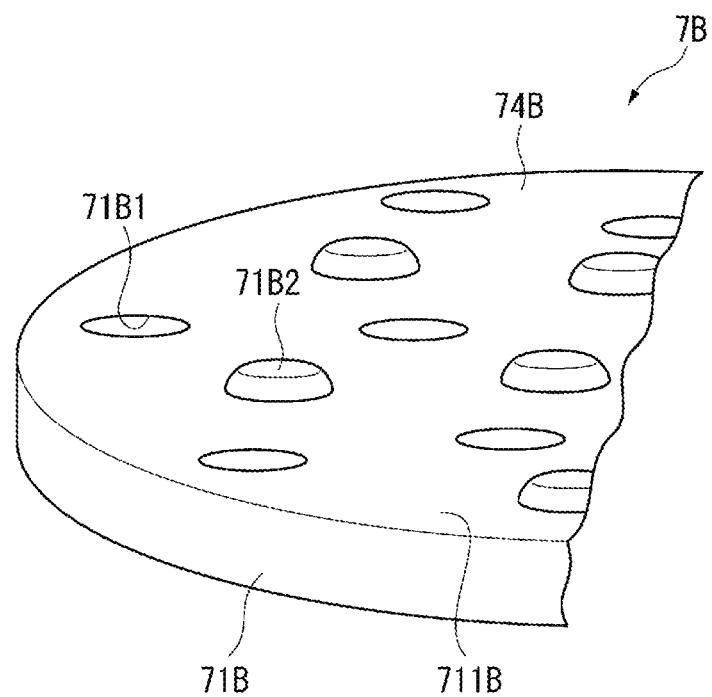
FIG. 6 is a diagram when a wavelength conversion device of a projector according to a modification example of the second embodiment of the invention is seen from the incident side of light which is incident on the wavelength conversion device.

FIG. 5 is a cross-sectional view illustrating a wavelength conversion device of a projector according to the present embodiment. As shown in FIG. 6, a wavelength conversion device 7A includes a base member 71A, the wavelength conversion layer 72, and the motor 75.

The base member 71A is formed in a substantially discoid shape, and is configured such that a plurality of projection portions 71A1 extending linearly are formed in a region located further outside than the wavelength conversion layer 72 on a first surface 711A in the base member 71A. The plurality of projection portions 71A1 are disposed at regular intervals in a second region 74A located further outside than the wavelength conversion layer 72. For this reason, a plurality of irregularities are formed in second region 74A in the base member 71A. The plurality of projection portions 71A1 are formed, for example, by performing a press process on the base member 71A.

In addition, in the present embodiment, the distances L1 to L4 are also the same as those in the first embodiment, and thus the surface area of the second region 74A becomes larger than the surface area of the second region 74 of the first embodiment by the irregularities being formed therein. Therefore, on the first surface 711A of the base member 71A, the area of the second region 74A becomes reliably larger than the area of the first region 73A.

Effect of Second Embodiment

The projector according to the present embodiment exhibits the same effect as that of the projector 1 according to the first embodiment, and additionally exhibits the following effects.

Since the region (second region 74A) located further outside than the wavelength conversion layer 72 on the first surface 711A of the base member 71A has a plurality of irregularities, it is possible to increase the surface area of the second region 74A, that is, a heat dissipation area for dissipating heat of the wavelength conversion layer 72, as compared to a case where the second region is flat.

Therefore, it is possible to further suppress a decrease in the wavelength conversion efficiency of the wavelength conversion device 7A.

Modification Example of Second Embodiment

The wavelength conversion device 7A of the second embodiment includes the base member 71A, and is configured such that the plurality of projection portions 71A1 are formed in the second region 74A located further outside than the wavelength conversion layer 72 on the first surface 711A of the base member 71A. However, the invention is not limited thereto.

FIG. 6 is a perspective view of a base member 71B of a wavelength conversion device 7B according to a modification example of the present embodiment.

The wavelength conversion device 7B includes the base member 71B instead of the base member 71A. A plurality of recess portions 71B1 and a plurality of projection portions 71B2 are formed in a second region 74B located further outside than the wavelength conversion layer 72 on a first surface 711B of this base member 71B. The plurality of recess portions 71B1 and the plurality of projection portions 71B2 are formed on the first surface 711B so that the recess portion 71B1 and the projection portion 71B2 are next to each other. The pluralities of recess portions 71B1 and projection portions 71B2 are formed by performing, for example, a press process on the base member 71B.

In addition, in the modification example, the distances L1 to L4 are also the same as those in the second embodiment, and thus the surface area of the second region 74B becomes larger than the surface area of the second region 74 of the first embodiment by the plurality of recess portions 71B1 and the plurality of projection portions 71B2 being formed therein. Therefore, on the first surface 711B of the base member 71B, the area of the second region 74B becomes reliably larger than the area of the first region 73B. Therefore, it is possible to exhibit the same operational effect as that in the second embodiment.

In addition, in the modification example, the plurality of recess portions 71B1 and the plurality of projection portions 71B2 are formed in the second region 74B. Thereby, when the base member 71B is rotated by drive of the motor 75, and a cooling gas circulates from the rotational axis P to the outside of the wavelength conversion layer 72, an air current is disturbed due to the plurality of recess portions 71B1 and the plurality of projection portions 71B2, and thus turbulence or an eddy current is generated. Thereby, the second region 74B of the base member 71B can be efficiently cooled by a cooling gas. Therefore, it is possible to further suppress a decrease in the wavelength conversion efficiency of the wavelength conversion device 7B.

Third Embodiment

Next, a third embodiment of the invention will be described.

A projector according to the present embodiment has substantially the same configuration as that of the projector 1 according to the first embodiment, and is partially different in the shape of the base member of the wavelength conversion device from the projector 1.

Specifically, in that the wavelength conversion device 7 of the projector 1 includes the base member 71, whereas the wavelength conversion device of the present embodiment includes the base member having a through-hole formed therein, both the wavelength conversion devices are different from each other.

In the following description, the same or substantially the same portions as the portions previously described are denoted by the same reference numerals and signs, and thus the description thereof will not be given.

Figure 7:
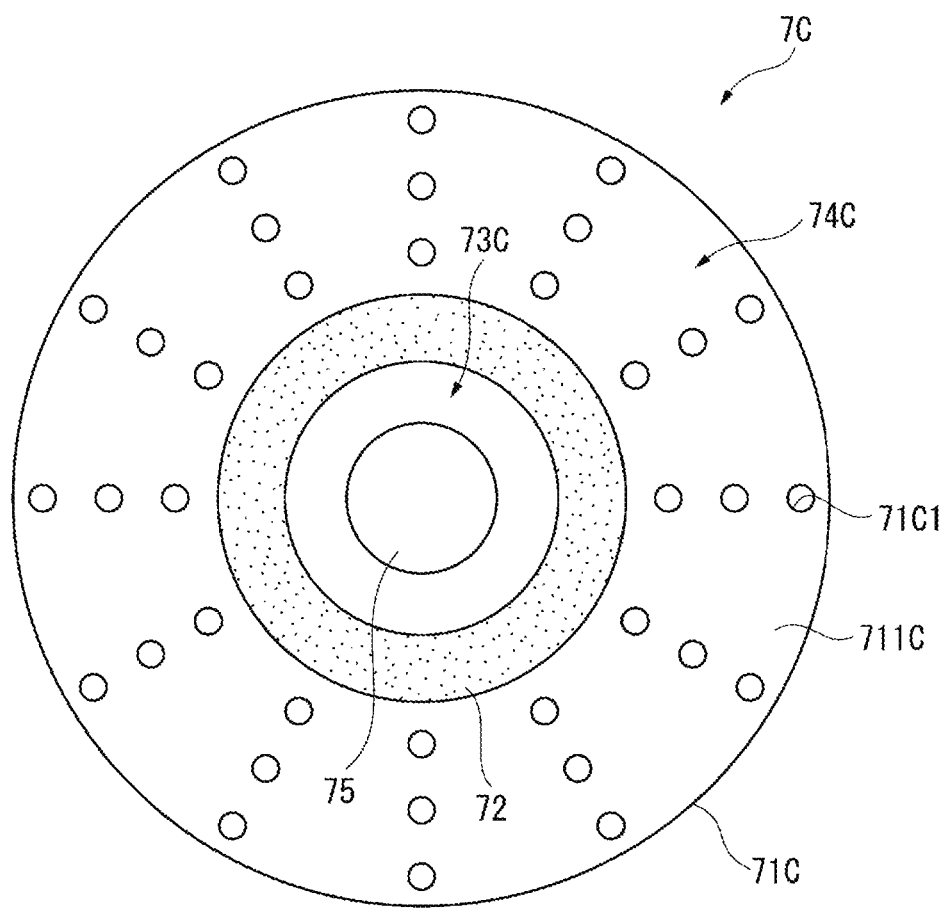
FIG. 7 is a plan view when a portion of a base member in a wavelength conversion device of a projector according to third embodiment of the invention is seen from the incident side of light.

FIG. 7 is a plan view illustrating a wavelength conversion device 7C of a projector according to the present embodiment.

Figure 8:
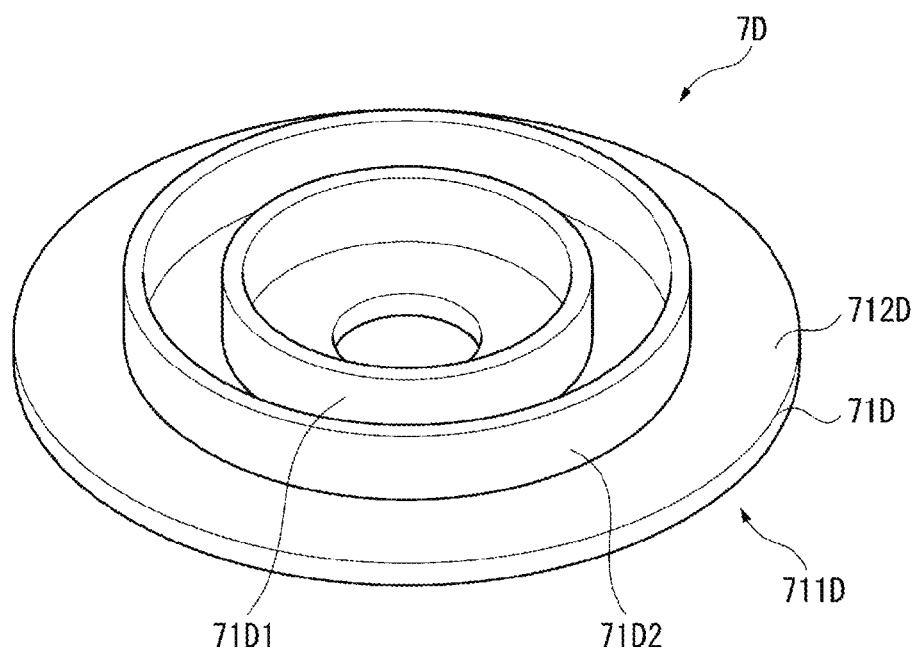
FIG. 8 is a perspective view when a wavelength conversion device of a projector according to a fourth embodiment of the invention is seen from the incident side of light which is incident on the wavelength conversion device.

As shown in FIG. 8, the wavelength conversion device 7C includes a base member 71C, the wavelength conversion layer 72, and the motor 75.

The base member 71C is formed in a substantially discoid shape, and is configured such that a plurality of through-holes 71C1 are formed in a second region 74C located outside the wavelength conversion layer 72 on a first surface 711C in the base member 71C. The plurality of through-holes 71C1 are radially disposed at regular intervals in the second region 74C located outside the wavelength conversion layer 72. The plurality of through-holes 71C1 are formed by performing, for example, a press process on the base member 71C.

In addition, in the present embodiment, the distances L1 to L4 are also the same as those in the first embodiment, and thus the surface area of the second region 74C becomes larger than the surface area of the second region 74 of the first embodiment by the plurality of through-holes 71C1 being formed therein. Therefore, on the first surface 711C of the base member 71C, the area of the second region 74C becomes reliably larger than the area of the first region 73C.

Further, in the present embodiment, the plurality of through-holes 71C1 are formed in the second region 74C. Thereby, when the base member 71C is rotated by drive of the motor 75, and a cooling gas circulates from the rotational axis P to the outside of the wavelength conversion layer 72, the cooling gas circulates through the plurality of through-holes 71C1.

Effect of Third Embodiment

The projector according to the present embodiment exhibits the same effect as that of the projector 1 according to the first embodiment, and additionally exhibits the following effects.

Since the plurality of through-holes 71C1 passing through the base member 71C are formed in the second region 74C located further outside than the wavelength conversion layer 72 in the base member 71C, it is possible to increase the heat dissipation area of the second region C1, as compared to a case where the second region is flat. Therefore, it is possible to further suppress a decrease in the wavelength conversion efficiency of the wavelength conversion device 7C.

Fourth Embodiment

Next, a fourth embodiment of the invention will be described.

A projector according to the present embodiment has substantially the same configuration as that of the projector 1 according to the first embodiment, and is partially different in the shape of the base member of the wavelength conversion device from the projector 1.

Specifically, in that the wavelength conversion device 7 of the projector 1 includes the base member 71, whereas a wavelength conversion device of the present embodiment includes a base member having a plurality of protruding portions, both the wavelength conversion devices are different from each other.

In the following description, the same or substantially the same portions as the portions previously described are denoted by the same reference numerals and signs, and thus the description thereof will not be given.

Figure 9:
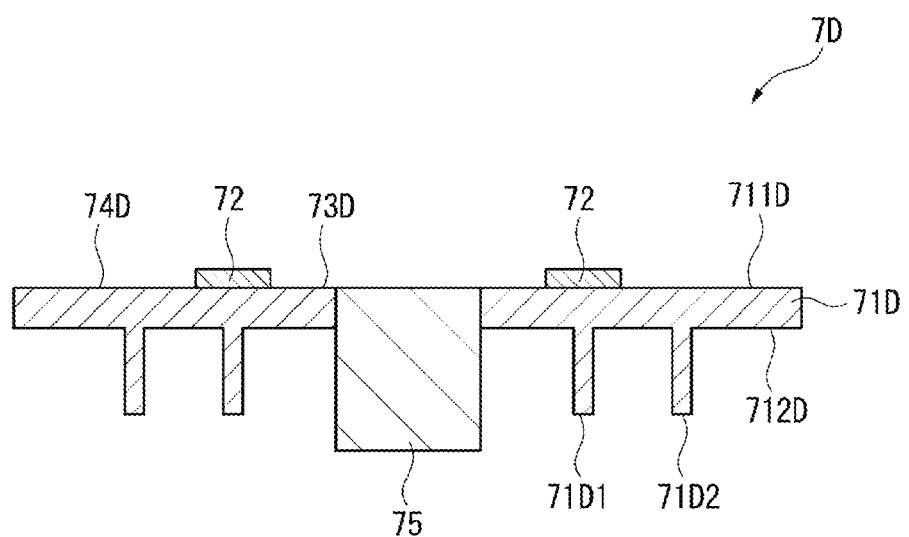
FIG. 9 is a cross-sectional view when a wavelength conversion device of a projector according to a fifth embodiment of the invention is seen from the opposite side to the incident side of light which is incident on the wavelength conversion device.

FIG. 8 is a perspective view when a wavelength conversion device 7D of a projector according to the present embodiment is seen from the opposite side to the incident direction of light, and FIG. 9 is a cross-sectional view of the wavelength conversion device 7D according to the present embodiment. In FIG. 8, the motor 75 is not shown.

As shown in FIGS. 8 and 9, the wavelength conversion device 7D includes a base member 71D, the wavelength conversion layer 72, and the motor 75.

The base member 71D is formed in a substantially discoid shape, and has a first surface 711D and a second surface 712D facing the first surface 711D. The second surface 712D of the base member 71D out of these surfaces is provided with a first protruding portion 71D1 and a second protruding portion 71D2 which extend in the normal direction of the second surface 712D.

The first protruding portion 71D1 is formed in an annular shape, and is disposed at a position facing the wavelength conversion layer 72 on the first surface 711D side, on the second surface 712D. In addition, the second protruding portion 71D2 is formed in an annular shape similarly to the first protruding portion 71D1, and is disposed outside the first protruding portion 71D1. In addition, the heights of the first protruding portion 71D1 and the second protruding portion 71D2 which protrude from the second surface 712D are set to be substantially the same as each other.

In the present embodiment, the distances L1 to L4 are also the same as those in the first embodiment, and thus the surface area of a second region 74D becomes larger than the surface area of the second region 74 of the first embodiment by the second protruding portion 71D2 being formed therein. Therefore, the surface area of the second region 74D becomes reliably larger than the area of a first region 73D.

Further, in the present embodiment, the first protruding portion 71D1 and the second protruding portion 71D2 are formed. Thereby, when the base member 71D is rotated by drive of the motor 75, and a cooling gas circulates from the rotational axis P to the outside of the wavelength conversion layer 72, the cooling gas circulates to the first protruding portion 71D1 and the second protruding portion 71D2.

Effect of Fourth Embodiment

The projector according to the present embodiment exhibits the same effect as that of the projector 1 according to the first embodiment, and additionally exhibits the following effects.

Since the first protruding portion 71D1 and the second protruding portion 71D2 are included which protrude from the second surface 712D of the base member 71D in the normal direction of the second surface 712D, it is possible to increase the heat dissipation area of the second region 74D, as compared to a case where the protruding portion is not provided in the second region. Therefore, it is possible to reliably suppress a decrease in the wavelength conversion efficiency of the wavelength conversion device 7D.

In addition, since the first protruding portion 71D1 is formed at a position facing the wavelength conversion layer 72 on the second surface 712D, heat from the wavelength conversion layer 72 is conducted to the first protruding portion 71D1, and a cooling gas circulates to the first protruding portion 71D1, thereby allowing the wavelength conversion layer 72 to be more efficiently cooled.

Fifth Embodiment

Next, a fifth embodiment of the invention will be described.

A projector according to the present embodiment has substantially the same configuration as that of the projector 1 according to the first embodiment, and is partially different in the shape of the base member of the wavelength conversion device from the projector 1.

Specifically, in that the wavelength conversion device 7 of the projector 1 includes the discoid base member 71, whereas a wavelength conversion device of the present embodiment includes a cylindrical base member, both the wavelength conversion devices are different from each other.

In the following description, the same or substantially the same portions as the portions previously described are denoted by the same reference numerals and signs, and thus the description thereof will not be given.

Figure 10:
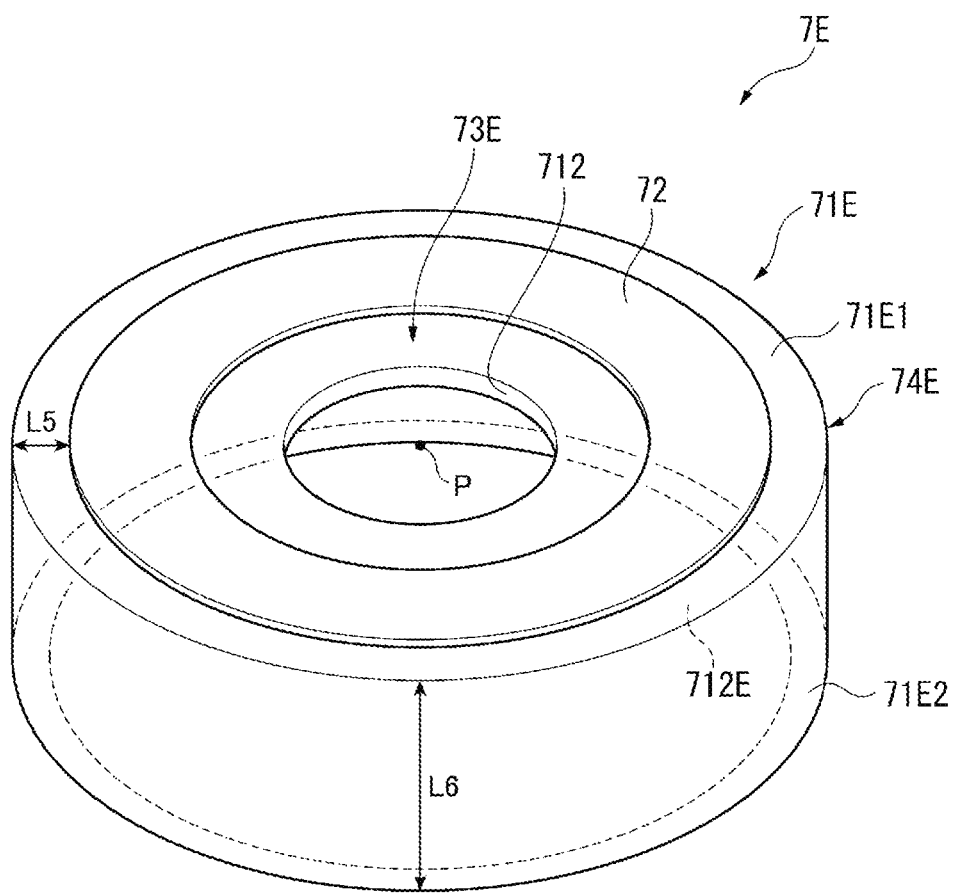
FIG. 10 is a perspective view of the wavelength conversion device of the projector according to the fifth embodiment.

FIG. 10 is a perspective view illustrating a wavelength conversion device 7E of a projector according to the present embodiment.

In FIG. 10, the motor 75 is not shown.

A base member 71E of the wavelength conversion device 7E is formed in a substantially cylindrical shape, and includes a flat plate portion 71E1 having a substantially discoid shape, and an annular portion 71E2 extending from the outer circumferential edge of the flat plate portion 71E1 in the normal direction of a second surface 712E. The flat plate portion 71E1 out of these portions has a first surface 711E and a second surface 712E facing the first surface 711E. In addition, the opening 713 is formed at the substantially central portion of the flat plate portion 71E1, and the wavelength conversion layer 72 is formed at a position surrounding the opening 713 on the first surface 711E.

In addition, the annular portion 71E2 is equivalent to the protruding portion according to the invention, and is formed in an annular shape extending from the outer circumferential edge of the flat plate portion 71E1 on the second surface 712E in the normal direction of the second surface 712E.

The thickness dimension (distance L5) of this annular portion 71E2 is set to approximately 5 mm. Further, the height dimension (distance L6) of the annular portion 71E2 is set to approximately 35 mm. That is, a sum of the distance L3 from the rotational axis P to the outer edge of the wavelength conversion layer 72, the distance L5 and the distance L6 is set to be larger by approximately 5 mm than the distance L2.

In the present embodiment, the annular portion 71E2 and a region (region located further outside than the wavelength conversion layer 72) other than a first region 73E and the wavelength conversion layer 72 on the first surface 711E serve as a second region 74E in the present embodiment.

In the present embodiment, since the distances L1, L3, and L4 are also the same as those in the first embodiment, and a sum of the distance L3 from the rotational axis P to the outer edge of the wavelength conversion layer 72, the distance L5 and the distance L6 is set to be larger than the distance L2, the surface area of the second region 74E becomes larger than the surface area of the second region 74 of the first embodiment by the annular portion 71E2 being formed therein. Therefore, in the base member 71E, the area of the second region 74E becomes reliably larger than the area of the first region 73E.

In addition, in the present embodiment, the annular portion 71E2 is formed. Thereby, when the base member 71E is rotated by drive of the motor 75, and a cooling gas circulates from the rotational axis P to the outside of the wavelength conversion layer 72, the cooling gas circulates to the annular portion 71E2.

Further, in the present embodiment, the radius (sum of the distance L3 and the distance L5) of the flat plate portion 71E1 becomes smaller than the radius (the distance L2) of the base member 71 of the first embodiment.

Effect of Fifth Embodiment

The projector according to the present embodiment exhibits the same effect as that of the projector 1 according to the fourth embodiment, and additionally exhibits the following effects.

Since the radius (sum of the distance L3 and the distance L5) of the flat plate portion 71E1 can be made to be smaller than the radius (the distance L2) of the base member 71 of the first embodiment, it is possible to reduce the size of the wavelength conversion device 7E. In addition, since the size of the wavelength conversion device 7E can be reduced, it is possible to reduce the sizes of the illumination device including the wavelength conversion device 7E, and the projector.

Modification of Embodiment

The invention is not limited to each of the embodiments, and modifications, improvements and the like within a range capable of achieving the object of the invention are included in the invention. In each of the embodiments, the base members 71 and 71A to 71E are configured to be constituted of aluminum. However, the invention is not limited thereto. For example, in a case of a transmission-type wavelength conversion device, the base member may be constituted by a light-transmitting member of glass or the like.

In the first to fourth embodiments, the distance L1 is set to approximately 10 mm, the distance L2 is set to approximately 55 mm, the distance L3 is set to approximately 20 mm, and the distance L4 is set to approximately 31.5 mm. However, the invention is not limited thereto. That is, in a case where the surface areas of the second regions 74 and 74A to 74E are larger than the surface areas of the first regions 73 and 73A to 73E, the distances L1 to L4 may be set to any values.

In each of the embodiments, the wavelength conversion layer 72 is configured to be formed in an annular shape. However, the invention is not limited thereto. For example, arc-like wavelength conversion layers may be configured to be disposed in an annular shape at regular intervals. That is, such a configuration may preferably have a shape capable of partitioning the first regions 73 and 73A to 73E located inside the wavelength conversion layer, and the second regions 74 and 74A to 74E located outside the wavelength conversion layer.

In addition, in each of the embodiments, a description has been given of a form in which the base members 71 and 71A to 71E are formed in a substantially discoid shape or in a substantially cylindrical shape and are rotated by the motor 75, but a rectangular or polygonal base member can also be used without being limited thereto. In addition, while the base member 71 is rotated in order to enhance a heat dissipation effect, thermal saturation is not likely to be generated even when the base member is not rotated. That is, a configuration in which the base member 71 is not rotated may be used.

In the first embodiment, the wavelength conversion layer 72 is configured to be formed in the base member 71 by a mask printing method. However, the invention is not limited thereto. For example, the wavelength conversion layer 72 formed in advance may adhere to the base member 71.

In the second to fourth embodiments, the plurality of projection portions 71A1, the pluralities of recess portions 71B1 and projection portions 71B2, and the plurality of through-holes 71C1 are configured to be formed by performing a press process on the base members 71A, 71B, and 71C. However, the invention is not limited thereto. For example, the plurality of projection portions 71A1, the pluralities of recess portions 71B1 and projection portions 71B2, and the plurality of through-holes 71C1 may be formed by performing blasting or edging on the base members 71A to 71C.

In the second embodiment, the plurality of projection portions 71A1 is configured to be provided on the first surface 711A of the second region 74A. However, the invention is not limited thereto. For example, the plurality of projection portions 71A1 may be further provided on the second surface 712A, and may be provided on only the second surface 712A. In this case, it is also possible to exhibit the same effect as that of the second embodiment. In addition, the same is true of a modification example of the second embodiment.

In the third embodiment, the plurality of through-holes 71C1 are configured to be radially disposed at regular intervals in the second region 74C located further outside than the wavelength conversion layer 72. However, the invention is not limited thereto. For example, the through-holes may be disposed at regular intervals in the entirety of the second region 74C located further outside than the wavelength conversion layer 72, and a plurality of arc-like through-holes may be radially disposed. That is, a plurality of through-holes may be formed in the second region 74C of the base member 71C.

In the fourth embodiment, the heights of the first protruding portion 71D1 and the second protruding portion 71D2 which protrude from the second surface 712D are set to be substantially the same as each other, but any one protruding portion of the first protruding portion 71D1 and the second protruding portion 71D2 may protrude further than the other protruding portion without being limited thereto. In addition, the first protruding portion 71D1 and the second protruding portion 71D2 are included, but only any one protruding portion may be provided, and an annular protruding portion may be further provided on at least one of the inner side of the first protruding portion 71D1 and the outer side of the second protruding portion 71D2. That is, the protruding portion may be formed on the second surface 712D of the base member 71D.

In addition, in the fourth embodiment, the first protruding portion 71D1 and the second protruding portion 71D2 are formed on the second surface 712D of the base member 71D. However, the invention is not limited thereto. For example, the first protruding portion 71D1 and the second protruding portion 71D2 may be formed on the first surface 711D. In addition, one of the first protruding portion 71D1 and the second protruding portion 71D2 may be formed on the first surface 711D, and the other may be formed on the second surface 712D.

In the fifth embodiment, the annular portion 71E2 is configured to have a shape of protrusion in the normal direction of the second surface 712E. However, the invention is not limited thereto. For example, the annular portion 71E2 may protrude in a direction of inclination from the second surface 712E with respect to the normal line, and may protrude in the normal direction of the first surface 711E. In this case, it is also possible to exhibit the same effect as that of the fifth embodiment.

In the second to fifth embodiments, the plurality of projection portions 71A1, the pluralities of recess portions 71B1 and projection portions 71B2, the plurality of through-holes 71C1, the first protruding portion 71D1, the second protruding portion 71D2, and the annular portion 71E2 are configured to be included. However, the invention is not limited thereto.

For example, the plurality of projection portions 71A1 and the plurality of through-holes 71C1 may be included in the base member 71, the plurality of through-holes 71C1, the first protruding portion 71D1 and the second protruding portion 71D2 may be included, and the plurality of projection portions 71A1 and the annular portion 71E2 may be included.

That is, the plurality of projection portions 71A1, the pluralities of recess portions 71B1 and projection portions 71B2, the plurality of through-holes 71C1, the first protruding portion 71D1, the second protruding portion 71D2, and the annular portion 71E2 may be formed in the base member in any combination thereof. In other words, in a case where the surface area of the second region 74 is larger than the surface area of the first region 73, the base member may have any shape.

In each of the embodiments, a transmission-type light modulating device is configured to be used as the light modulating device. However, the invention is not limited thereto. For example, a reflection-type light modulating device may be used as the light modulating device. In this case, color separation and color synthesis may be executed by the color synthesizing device 35 without providing the color separation device 32.

In each of the embodiments, the projector 1 is configured to include three light modulating devices 34 (34R, 34G, and 34B), but the invention is not limited thereto. For example, the number of light modulating devices may be one, two, and four or more.

In addition, as the light modulating device, light modulating devices, such as a digital micromirror device, other than a liquid crystal panel may be used.

What is claimed is:

1. A wavelength conversion device comprising a base member,
   wherein the base member includes
      an opening which is formed in a center of the base member,
      a wavelength conversion layer which is disposed in an annular shape on a first surface of the base member and is formed outside of the opening,
      a first region of the first surface of the base member, the first region being located further inside than the wavelength conversion layer,
      a second region of the first surface of the base member, the second region being located further outside than the wavelength conversion layer and being larger in surface area than the first region,
      a first protruding portion which is located in the second region, and protrudes from a second surface of the base member on an opposite side to the first surface, and
      a second protruding portion which is disposed on the second surface of the base member in a location that overlaps with the wavelength conversion layer in a plan view,
   wherein
      the first protruding portion and the second protruding portion are cylindrical in shape,
      the first region is not covered with the wavelength conversion layer,
      the second region is not covered with the wavelength conversion layer, and
      a first radius of the first region that is measured from an inner edge of the wavelength conversion layer to a middle of the opening is smaller than a second radius of the second region that is measured from an outer edge of the wavelength conversion layer to an outer edge of the base member.

2. The wavelength conversion device according to claim 1, wherein the second region has a recess portion.

3. An illumination device comprising:
   the wavelength conversion device according to claim 2; and
   a light source that emits excitation light which is incident on the wavelength conversion layer of the wavelength conversion device,
   wherein the wavelength conversion layer converts the excitation light to be incident into light having a different wavelength.

4. A projector comprising:
   the illumination device according to claim 3;
   a light modulating device that modulates light emitted from the illumination device; and
   a projection optical device that projects the light modulated by the light modulating device.

5. The wavelength conversion device according to claim 1, wherein the second region has a through-hole that passes through the base member.

6. An illumination device comprising:
   the wavelength conversion device according to claim 5; and
   a light source that emits excitation light which is incident on the wavelength conversion layer of the wavelength conversion device, wherein the wavelength conversion layer converts the excitation light to be incident into light having a different wavelength.

7. A projector comprising:
the illumination device according to claim 6;
a light modulating device that modulates light emitted from the illumination device; and
a projection optical device that projects the light modulated by the light modulating device.

8. An illumination device comprising:
the wavelength conversion device according to claim 1; and
a light source that emits excitation light which is incident on the wavelength conversion layer of the wavelength conversion device,
wherein the wavelength conversion layer converts the excitation light to be incident into light having a different wavelength.

9. A projector comprising:
the illumination device according to claim 8;
a light modulating device that modulates light emitted from the illumination device; and
a projection optical device that projects the light modulated by the light modulating device.

10. The wavelength conversion device according to claim 1, wherein a projection portion is disposed in the second region on the first surface.

11. The wavelength conversion device according to claim 1, wherein a plurality of projection portions and a plurality of recess portions are formed on the first surface of the base member in the second region.

12. The wavelength conversion device according to claim 1, wherein a plurality of through holes are formed in the second region of the base member.

13. The wavelength conversion device according to claim 1, wherein the first protruding portion is disposed in an annular shape on the second surface of the base member and is formed around the opening.

14. The wavelength conversion device according to claim 1, wherein the second protruding portion is disposed in an annular shape on the second surface of the base member and is formed around the opening.

15. The wavelength conversion device according to claim 14,
wherein
the wavelength conversion layer is formed on the first surface at a first position around the opening, and
the second protruding portion is formed on the second surface at a second position around the opening, and
the second position where the second protruding portion is formed on the second surface around the opening overlaps, in the plan view, the first position where the wavelength conversion layer is formed on the first surface around the opening.

16. A wavelength conversion device comprising a base member,
wherein the base member includes
an opening which is formed in a center of the base member,
a wavelength conversion layer which is disposed in an annular shape on a first surface of the base member and is formed outside of the opening,
a first region of the first surface of the base member, the first region being located further inside than the wavelength conversion layer,
a second region of the first surface of the base member, the second region being located further outside than the wavelength conversion layer and being larger in surface area than the first region,
a first protruding portion which is located in the second region, and protrudes from a second surface of the base member on an opposite side to the first surface, and
a second protruding portion which is disposed on the second surface of the base member in a location that overlaps with the wavelength conversion layer in a plan view,
wherein
the second protruding portion is disposed in an annular shape on the second surface of the base member and is formed around the opening,
the wavelength conversion layer is formed on the first surface at a first position around the opening,
the second protruding portion is formed on the second surface at a second position around the opening,
the second position where the second protruding portion is formed on the second surface around the opening overlaps, in the plan view, the first position where the wavelength conversion layer is formed on the first surface around the opening,
the first region is not covered with the wavelength conversion layer,
the second region is not covered with the wavelength conversion layer, and
a first radius of the first region that is measured from an inner edge of the wavelength conversion layer to a middle of the opening is smaller than a second radius of the second region that is measured from an outer edge of the wavelength conversion layer to an outer edge of the base member.

17. An illumination device comprising:
the wavelength conversion device according to claim 16; and
a light source that emits excitation light which is incident on the wavelength conversion layer of the wavelength conversion device,
wherein the wavelength conversion layer converts the excitation light to be incident into light having a different wavelength.

18. A projector comprising:
the illumination device according to claim 17;
a light modulating device that modulates light emitted from the illumination device; and
a projection optical device that projects the light modulated by the light modulating device.

* * * * *